(12) United States Patent
Harazim

(10) Patent No.: US 7,591,882 B2
(45) Date of Patent: Sep. 22, 2009

(54) METHOD FOR SEPARATING GAS MIXTURES AND A GAS CENTRIFUGE FOR CARRYING OUT THE METHOD

(75) Inventor: Wolfgang Harazim, Zwickau (DE)

(73) Assignee: Rerum Cognito Forschungszentrum GmbH, Zwickau (DE)

( * ) Notice: Subject to any disclaimer, the term of this patent is extended or adjusted under 35 U.S.C. 154(b) by 524 days.

(21) Appl. No.: 10/537,321

(22) PCT Filed: Dec. 1, 2003

(86) PCT No.: PCT/DE03/03968

§ 371 (c)(1),
(2), (4) Date: Mar. 10, 2006

(87) PCT Pub. No.: WO2004/050255

PCT Pub. Date: Jun. 17, 2004

(65) Prior Publication Data

US 2006/0230933 A1  Oct. 19, 2006

(30) Foreign Application Priority Data

Dec. 2, 2002  (DE) ............................... 102 56 369

(51) Int. Cl.
*B01D 45/12* (2006.01)
(52) U.S. Cl. .................... 95/270; 55/406; 55/407; 55/408; 95/31; 95/34; 95/35
(58) Field of Classification Search ............... 55/406, 55/407, 408; 95/31, 34, 35, 270
See application file for complete search history.

(56) References Cited

U.S. PATENT DOCUMENTS

| 1,061,656 | A | | 5/1913 | Black | |
|---|---|---|---|---|---|
| 3,915,673 | A | * | 10/1975 | Tamai et al. | 95/35 |
| 4,092,130 | A | * | 5/1978 | Wikdahl | 95/34 |
| 4,832,709 | A | * | 5/1989 | Nagyszalanczy | 95/270 |
| 6,716,269 | B1 | * | 4/2004 | Graff et al. | 95/35 |

FOREIGN PATENT DOCUMENTS

DE  100 15 546 A1  1/2001

* cited by examiner

*Primary Examiner*—Duane Smith
*Assistant Examiner*—Dung Bui
(74) *Attorney, Agent, or Firm*—Laurence A. Greenberg; Werner H. Stemer; Ralph E. Locher

(57) ABSTRACT

The invention relates to a method for separating gas mixtures by means of an inventive gas centrifuge during which a compressible working fluid from an axial central supply tube (1) is introduced into the enlarging casing space (2) whereby passing through the flow channels (6) of the compression area (A) of a double-walled centrifuge rotor (3) and, in the axially distant area (B) inside the double tube, is guided in flow channels (6) having a constant flow cross-section (4) when in the centrifuged state. The flow of gas is separated into a specifically heavier and a specifically lighter gas fraction at a separating barrier (8) that is dependent on the individual gas volume portion. Inside the flow channels (6), the separated gas fractions are forcibly guided, slowed down and diverted in a separate manner with decreasing axial distance. The acceleration of the gas molecules in compression area (A) and the slowing down of the gas fractions in expansion area (C) ensue in a manner that is proportional to mass.

6 Claims, 3 Drawing Sheets

METHOD FOR SEPARATING GAS MIXTURES AND A GAS CENTRIFUGE FOR CARRYING OUT THE METHOD

BACKGROUND OF THE INVENTION

Field of the Invention

The invention relates to a method for separating gas mixtures by means of a gas centrifuge, in which a compressible process fluid is introduced into a double-walled rotor and, as a consequence of the centrifugal forces that act, is compressed and separated on the basis of its density.

The invention also relates to a gas centrifuge for carrying out the separation of gas mixtures, which comprises a gas-carrying double-walled centrifuge rotor, which is in the form of a rotating drum, as part of an electric-motor drive.

A technical solution such as this is required for gas processing technology.

One technical solution which is evident from the subject matter of the invention has been disclosed in DE 100 15 546 A1. The gas centrifuge described there comprises a double-walled centrifuge rotor which has a compression area, an area remote from the axis and an expansion area. The double-walled centrifuge rotor has, seen in the flow direction, channels for radially supplying the relatively heavy gas fraction to the hollow drive shaft at the end of the area which is remote from the axis. In contrast, the relatively light gas fraction is passed to the vicinity of the drive axis in the expansion area, from where it is carried away.

The primary defect of the known technical solution is that, as a consequence of the process fluid turbulence, which must be deliberately accepted at the boundary layers that are formed and which is further increased by technical measures, through the centrifuge rotor, both the drag on the process fluid which is flowing through the centrifuge rotor and the density-dependent gas separate in the area of the centrifuge rotor which is remote from the axis are adversely affected.

SUMMARY OF THE INVENTION

The object of the invention is therefore to provide a technical solution by means of which it is possible to overcome the defects of the known prior art. This relates primarily to improving the efficiency of gas separation, which should be carried out in a single stage. Ignoring efficiency losses resulting from external friction, the amount of energy consumed for separation of the process fluid should essentially be compensated for by the gain in energy resulting from the expansion of the process fluid. Reducing internal turbulence has the aim of arranging the relatively heavy components of the process fluid predominantly in layers at the outer casing of the centrifuge rotor.

According to the invention, the object is achieved by the features of claims 1 to 6. The advantageous refinements are described in the dependent claims.

In principal, ignoring efficiency losses resulting from external friction, the amount of energy consumed for separation of the gas mixture is reduced, since the amount of energy for acceleration with a constant mass flow counteracts and compensates for the magnitude for braking.

In this context, the solution according to the invention proposes that the process fluid be channelized after entering the double wall of a centrifuge rotor, which is advantageously in the form of an external rotor of an electric-motor drive, so as to achieve a situation in which the process fluid that is being compressed and expanded flows in as laminar a form as possible, with minimal drag.

This avoids the resultant density stratification resulting from the acceleration of the process fluid in the area of the centrifuge rotor remote from the axis being disturbed by turbulence and the enrichment of relatively heavy gas molecules at the outer wall of the centrifuge rotor being adversely affected.

The configuration of the flow cross sections over the entire flow length of the centrifuge rotor such that they are proportional to the mass flow or volume flow or are inversely proportional to the pressure results in a low-turbulence process fluid flow, which is additionally assisted by the arrangement of flow channels formed between webs which are parallel to the axis.

The combination of a compression area followed by an expansion area in the centrifuge rotor makes it possible to operate the centrifuge while minimizing the consumption of mechanical drive energy.

In the area of the expected maximum separation of the process fluid, the gas flow is separated in a manner known per se into a relatively light and a relatively heavy gas fraction.

In summary, the advantages of the invention are the capability which is now provided to use a gas centrifuge of a type known per se for the separation of components of a gas mixture of different density in a separating stage by means of the proposed design and operating changes. The avoidance of unnecessary turbulence in the flow of the process fluid through the centrifuge rotor and the subsequent expansion of the initially compressed and possibly cooled process fluid result in particularly energy-efficient operation of the gas centrifuge.

The invention will be explained in more detail in the following text using exemplary embodiments. In the attached drawing:

EXEMPLARY EMBODIMENT 1

Figure 1:
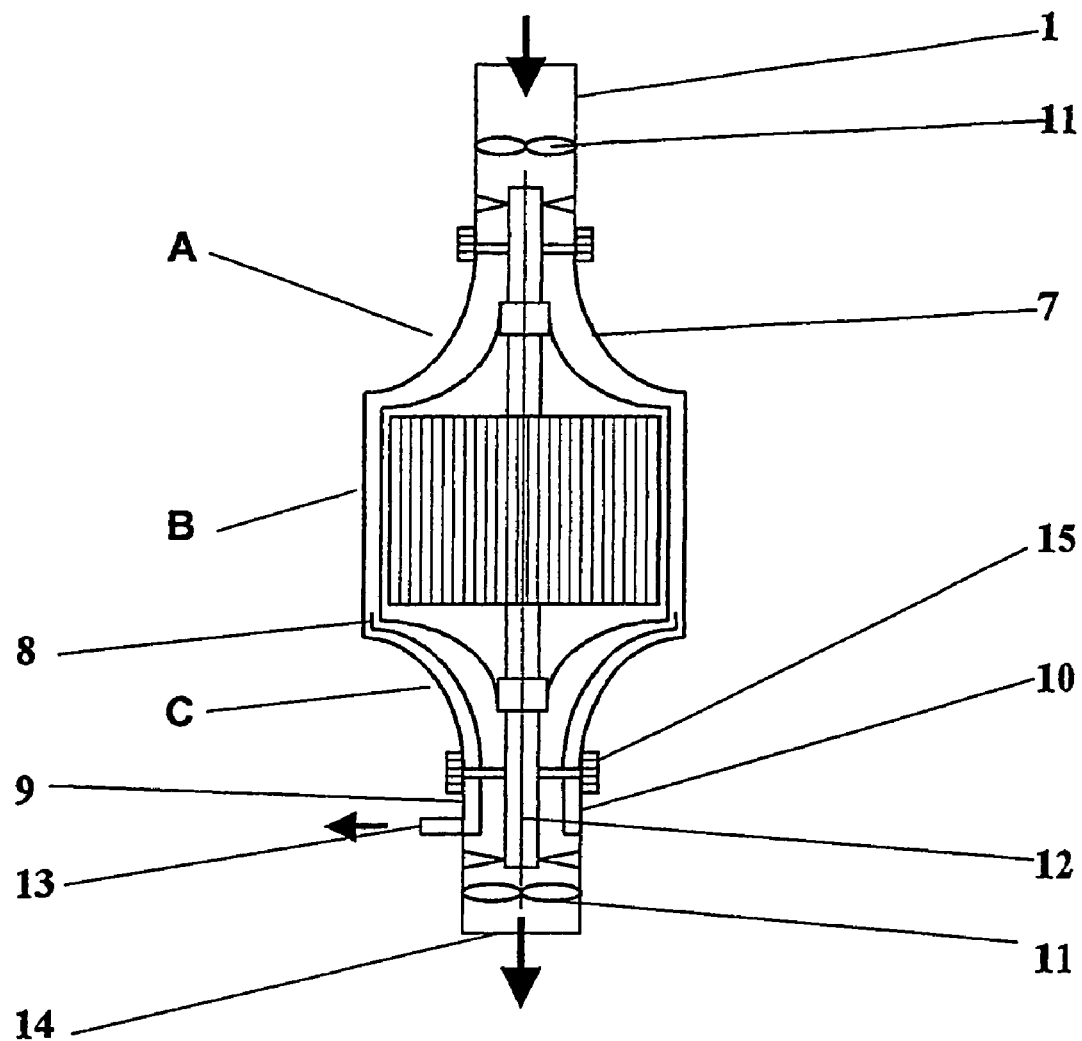
FIG. 1 shows a schematic longitudinal section through a gas centrifuge for separating gas mixtures with the flow cross sections being designed to be proportional to the mass flow.
Figure 2:
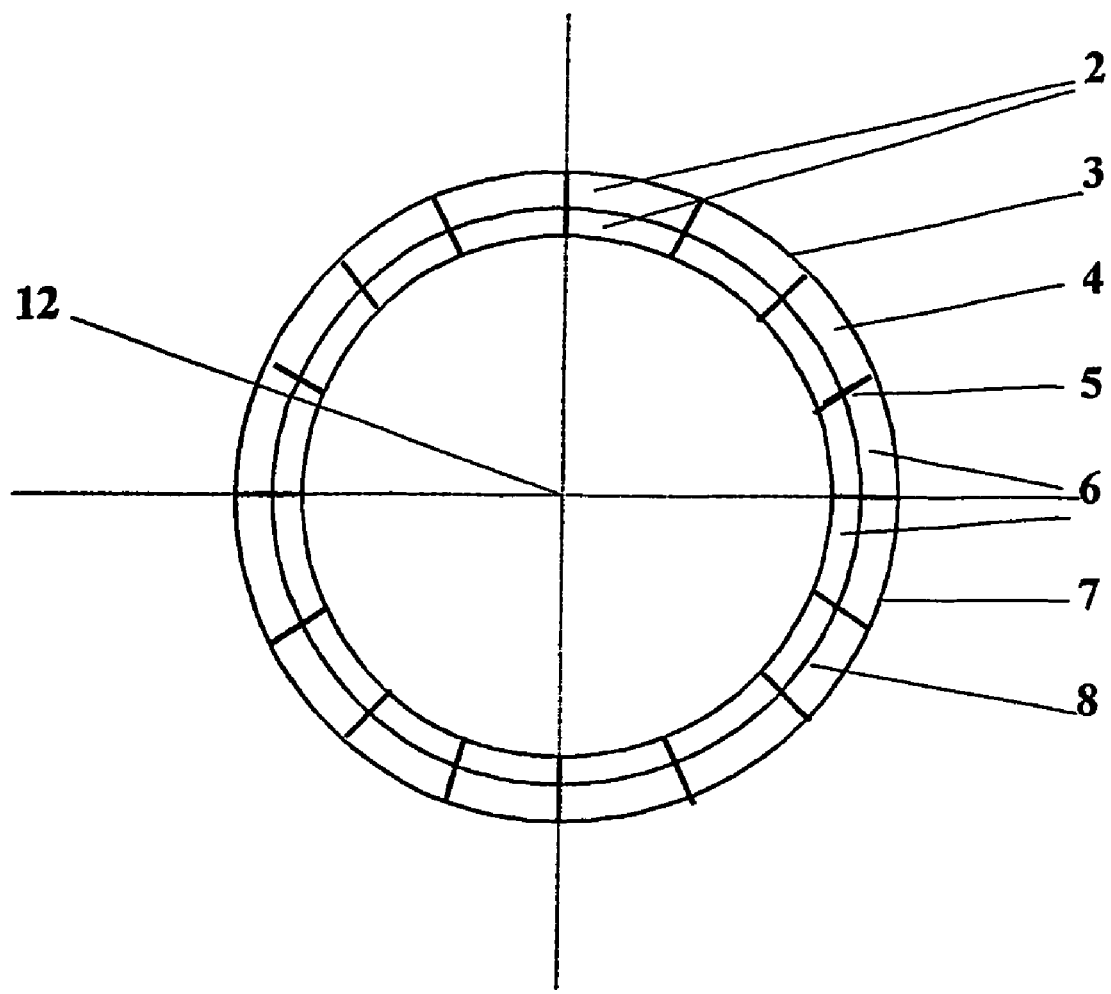
FIG. 2 shows a schematic longitudinal section through a gas centrifuge for separating gas mixtures with flow cross sections designed to be proportional to the volume flow or inversely proportional to the pressure.

FIGS. 1 and 2 show a gas centrifuge which is used for separating gas mixtures. The actual gas centrifuge in this case comprises a central supply tube 1 for the process fluid and the central outlet tube 10, which is used primarily as an outlet 14 for the lighter gas fraction. The double-walled centrifuge rotor 3 which is arranged between the supply and outlet tubes is connected in a gastight manner to the supply and outlet tubes 1, 10. The double-walled centrifuge rotor 3 is arranged between the supply and outlet tubes 1 and 10, with the connections to the stationary supply and outlet tubes 1, 10 being completed by labyrinth seals 15. The stationary shaft of the stator of the electric-motor drive for the gas centrifuge is positioned in the supply and outlet tubes 1 and 10. This shaft also forms the axis 12 of the centrifuge rotor 3. The double-walled centrifuge rotor 3 has double bearings on the stator shaft. The double-walled centrifuge rotor 3 is in this case in the form of an external rotor of the electric-motor drive of the gas centrifuge. Axial fans 11 are arranged in the supply and outlet tubes 1, 10, for transporting the process fluid through the gas centrifuge. The enveloping area 2 is arranged between the inner casing and the outer casing 7 of the double-walled centrifuge rotor 3, and is available for the process fluid to flow through the double-walled centrifuge rotor 3. The flow cross section 4 of the enveloping area 2 is constant on each plane that is arranged transversely with respect to the axis 12 of the centrifuge rotor 3, and is thus designed to be proportional to the mass flow. Webs 5 which are parallel to the axis are arranged in the enveloping area 2, with continuous flow channels 6 being formed between them for the process fluid. Seen in the flow direction, a concentric separating threshold 8 is arranged upstream of the transition from the area B which is remote from the axis to the expansion area C. The central outlet tube 10 contains an annular channel 9 in the outer area, for receiving and carrying away the higher-density gas fraction which is obtained at the separating threshold 8. This gas fraction can be extracted from this annular channel 9 via the extraction nozzle 13 of the gas centrifuge.

The process fluid passes through the central supply tube 1 into the enveloping area 2 of the double-walled centrifuge rotor 3, where the process fluid is carried in flow channels 6 between the webs 5 which are parallel to the axis, until it reaches the position remote from the axis.

Since the gas molecules are accelerated on a circular path, the mass-related centrifugal forces act with different intensities on the individual gas molecules, thus resulting in separation and a stratified arrangement of the different gas molecules in the flow cross section.

The compression of the process fluid reaches values of more than 2.0 bar when the double-walled centrifugal rotor 3 is equipped with a radius of less than 0.5 m and is operated at a rotation speed of about 8000 rpm. This change in the process fluid parameters takes place in the compression area A. In the area B of the double-walled centrifuge rotor 3 which is remote from the axis, the process fluid flows in the flow channel 6 along the outer casing 7, with the aim being that the flow of the process fluid should be as laminar as possible in the flow channels 6 which are formed between the webs 5 which are parallel to the axis. This increases the capability for the relatively heavy parts of the process fluid to remain against the outer casing 7 of the double-walled centrifuge rotor 3. The separating threshold 8 is arranged upstream of the transition from the area B which is remote from the axis to the expansion area C in the vicinity of the outer casing as a function of the proportions by volume of the individual gases, and separates the at least partially separated process fluid into a gas fraction with a relatively high density and into a gas fraction with a relatively low density. In the exemplary embodiment, the gas fraction with the relatively high density contains greater proportions of molecular oxygen. The gas fraction with the relatively low density contains greater proportions of molecular nitrogen than the unseparated process fluid.

The expansion of the gas fractions of the process fluid which are carried in the expansion area C makes it possible to reduce the drive energy that is required to a minimum.

The central outlet tube 10 contains an annular channel 9 into which the gas fraction with the relatively high density that is obtained is introduced. The extraction nozzle 13 for the oxygen-rich component of the process fluid is arranged on this annular channel 9. In contrast, a nitrogen-rich component is obtained at the outlet 14 for the relatively light gas fraction.

EXEMPLARY EMBODIMENT 2

Figure 3:
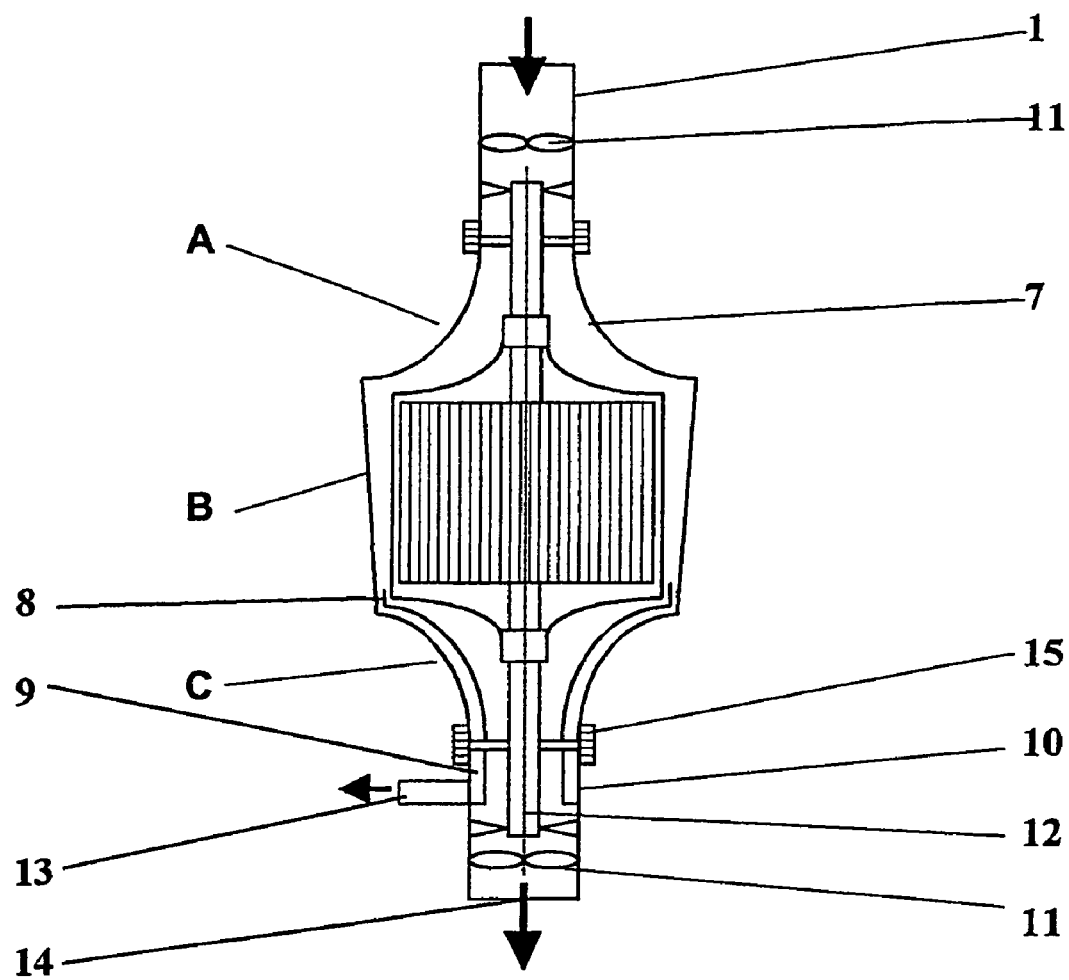
FIG. 3 shows a schematic cross section through the centrifuge rotor.

A gas centrifuge designed as in the example 1 is shown in FIGS. 2 and 3.

In contrast to the situation in the example 1, the flow cross sections both in the compression area A and in the area B which is remote from the axis as well as those in the expansion area C are not designed to be proportional to the mass flow but to be proportional to the volume flow or inversely proportional to the pressure. In the compression area A, with a continuous increase in the pressure of the process fluid which is subject to the influence of the centrifugal forces, this leads to a continuous reduction in the flow cross sections until the area B which is remote from the axis is reached. In the area B which is remote from the axis, the increasing separation of the process fluid leads to a further minor increase in the centrifugal forces acting on the heavy gas molecules, and thus in the pressure of the process fluid, thus also leading to a reduction in the volume flow. This is taken into account by reducing the flow cross section to the start of the expansion area C.

At the end of the area which is remote from the axis, the partially separated process fluid is separated at a separating threshold 8 into two gas fractions, and is expanded in the expansion area C.

Matching the flow cross sections to the respective actual volume flow considerably restricts turbulence, and thus results in more effective stratification of the components of different density in the process fluid.

Method for Separating Gas Mixtures, and a Gas Centrifuge for Carrying Out the Method

LIST OF REFERENCE SYMBOLS

1 Central supply tube
2 Enveloping area
3 Double-walled centrifuge rotor
4 Flow cross section
5 Webs parallel to the axis
6 Flow channels
7 Outer casing
8 Separating threshold
9 Annular channel in the central outlet tube
10 Central outlet tube
11 Axial fan
12 Axis of the centrifuge rotor
13 Extraction nozzle for the heavy gas fraction
14 Outlet for the light gas fraction
15 Labyrinth seal
A Compression area
B Area remote from the axis
C Expansion area

I claim:

1. In a method for separating gas mixtures with a gas centrifuge, wherein a compressible process fluid is introduced into a double-walled rotor and the process fluid is compressed and separated due to centrifugal forces, wherein gas molecules with a relatively higher molecular weight contained in the gas mixture are enriched along an outer wall of the rotor, and portions of the process fluid with mutually different contents of the components contained in the gas mixture are carried away separately, the improvement which comprises:

introducing the process fluid from an axial central supply tube into a widening enveloping area of the compression area of a double-walled centrifuge rotor, with a gas mass flow being shaped and positively guided on a circular path as an axial distance increases through the flow channels in the compression area;

carrying the process fluid with a constant flow cross section in a centrifuged state in the double tube in flow channels in the area of the double-walled centrifuge rotor remote from the axis;

in the centrifuged state, separating the gas flow into a relatively heavy gas fraction and a relatively light gas fraction at a separating threshold dependent on a proportion by volume of the individual gases;

positively guiding, braking and carrying away the separate gas fractions separately with decreasing axial distance in the flow channels upstream of a transition from an area remote from the axis to the expansion area, as seen in a flow direction;

wherein an acceleration of the gas molecules in the compression area and the braking of the gas fractions in the expansion area are proportional to the mass; and wherein the flow channels are formed between webs extending parallel to the axis, in the double-walled centrifuge rotor.

2. In a method for separating gas mixtures with a gas centrifuge, wherein a compressible process fluid is introduced into a double-walled rotor and the process fluid is compressed and separated due to centrifugal forces, wherein gas molecules with a relatively higher molecular weight contained in the gas mixture are enriched along an outer wall of the rotor, and portions of the process fluid with mutually different contents of the components contained in the gas mixture are carried away separately, the improvement which comprises:

introducing the process fluid from an axial central supply tube into a widening enveloping area of the compression area of a double-walled centrifuge rotor, with a gas mass flow being shaped and positively guided on a circular path as an axial distance increases through the flow channels in the compression area;

carrying the process fluid with a constant flow cross section in a centrifuged state in the double tube in flow channels in the area of the double-walled centrifuge rotor remote from the axis;

in the centrifuged state, separating the gas flow into a relatively heavy gas fraction and a relatively light gas fraction at a separating threshold dependent on a proportion by volume of the individual gases;

positively guiding, braking and carrying away the separate gas fractions separately with decreasing axial distance in the flow channels upstream of a transition from an area remote from the axis to the expansion area, as seen in a flow direction;

using axial fans in a central supply tube and/or in a central outlet tube, with a differential pressure increased in order to overcome flow losses of the process fluid throughout an entire centrifuge; and wherein an acceleration of the gas molecules in the compression area and the braking of the gas fractions in the expansion area are proportional to the mass.

3. In a method for separating gas mixtures with a gas centrifuge, wherein a compressible process fluid is introduced into a double-walled rotor and the process fluid is compressed and separated due to centrifugal forces, wherein gas molecules with a relatively higher molecular weight contained in the gas mixture are enriched along an outer wall of the rotor, and portions of the process fluid with mutually different contents of the components contained in the gas mixture are carried away separately, the improvement which comprises:

introducing the process fluid from an axial central supply tube into a widening enveloping area of a compression area of a double-walled centrifuge rotor, with a flow cross section for the process fluid being proportional to a volume flow in the flow channels in the compression area;

carrying the process fluid, in the area of the double-walled centrifuge rotor remote from the axis, in the double tube in flow channels in proportion to the volume flow with a reducing flow cross section; and separating the process fluid into a relatively heavy and into a relatively light gas fraction at a separating threshold, arranged concentrically as a function of a proportion by volume of individual gases, upstream of a transition from the area remote from the axis to an expansion area of the double-walled centrifuge rotor, as seen in a flow direction;

wherein the flow channels are formed between webs extending parallel to the axis, in the double-walled centrifuge rotor.

4. In a method for separating gas mixtures with a gas centrifuge, wherein a compressible process fluid is introduced into a double-walled rotor and the process fluid is compressed and separated due to centrifugal forces, wherein gas molecules with a relatively higher molecular weight contained in the gas mixture are enriched along an outer wall of the rotor, and portions of the process fluid with mutually different contents of the components contained in the gas mixture are carried away separately, the improvement which comprises:

introducing the process fluid from an axial central supply tube into a widening enveloping area of a compression area of a double-walled centrifuge rotor, with a flow cross section for the process fluid being proportional to a volume flow in the flow channels in the compression area;

carrying the process fluid, in the area of the double-walled centrifuge rotor remote from the axis, in the double tube in flow channels in proportion to the volume flow with a reducing flow cross section;

separating the process fluid into a relatively heavy and into a relatively light gas fraction at a separating threshold, arranged concentrically as a function of a proportion by volume of individual gases, upstream of a transition from the area remote from the axis to an expansion area of the double-walled centrifuge rotor, as seen in a flow direction; and using axial fans in a central supply tube and/or in a central outlet tube, with a differential pressure increased in order to overcome flow losses of the process fluid throughout an entire centrifuge.

5. In a method for separating gas mixtures with a gas centrifuge, wherein a compressible process fluid is introduced into a double-walled rotor and the process fluid is compressed and separated due to centrifugal forces, wherein gas molecules with a relatively higher molecular weight contained in the gas mixture are enriched along an outer wall of the rotor, and portions of the process fluid with mutually different contents of the components contained in the gas mixture are carried away separately, the improvement which comprises:

introducing the process fluid from an axial central supply tube into a widening enveloping area of a compression area of the double-walled centrifuge rotor, with a flow cross section for the process fluid being inversely proportional to a pressure in flow channels in a compression area;

in an area of the double-walled centrifuge rotor remote from a rotor axis, carrying the process fluid in a double tube in flow channels with a flow cross section decreasing in inverse proportion to a pressure; and separating the process fluid into a relatively heavy and into a relatively light gas fraction at a separating threshold located concentrically as a function of a proportion by volume of the individual gases, upstream of a transition from the area remote from the axis to the expansion area of the double-walled centrifuge rotor, as seen in a flow direction;

wherein the flow channels are formed between webs extending parallel to the axis, in the double-walled centrifuge rotor.

6. In a method for separating gas mixtures with a gas centrifuge, wherein a compressible process fluid is introduced into a double-walled rotor and the process fluid is compressed and separated due to centrifugal forces, wherein gas molecules with a relatively higher molecular weight contained in the gas mixture are enriched along an outer wall of the rotor, and portions of the process fluid with mutually different contents of the components contained in the gas mixture are carried away separately, the improvement which comprises:

introducing the process fluid from an axial central supply tube into a widening enveloping area of a compression area of the double-walled centrifuge rotor, with a flow cross section for the process fluid being inversely proportional to a pressure in flow channels in a compression area;

in an area of the double-walled centrifuge rotor remote from a rotor axis, carrying the process fluid in a double tube in flow channels with a flow cross section decreasing in inverse proportion to a pressure;

separating the process fluid into a relatively heavy and into a relatively light gas fraction at a separating threshold located concentrically as a function of a proportion by volume of the individual gases, upstream of a transition from the area remote from the axis to the expansion area of the double-walled centrifuge rotor, as seen in a flow direction; and using axial fans in a central supply tube and/or in a central outlet tube, with a differential pressure increased in order to overcome flow losses of the process fluid throughout an entire centrifuge.

* * * * *